(12) United States Patent
Arai et al.

(10) Patent No.: US 10,379,536 B2
(45) Date of Patent: Aug. 13, 2019

(54) DRIVING ASSISTANCE METHOD, AND DRIVING ASSISTANCE DEVICE, INFORMATION PRESENTATION DEVICE, AND RECORDING MEDIUM USING SAME

(71) Applicant: Panasonic Intellectual Property Management Co., Ltd., Osaka (JP)

(72) Inventors: Yuko Arai, Kanagawa (JP); Wataru Nakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/060,044

(22) PCT Filed: Dec. 16, 2016

(86) PCT No.: PCT/JP2016/005156
§ 371 (c)(1),
(2) Date: Jun. 7, 2018

(87) PCT Pub. No.: WO2017/110072
PCT Pub. Date: Jun. 29, 2017

(65) Prior Publication Data
US 2018/0356818 A1 Dec. 13, 2018

(30) Foreign Application Priority Data
Dec. 24, 2015 (JP) .................................. 2015-252650

(51) Int. Cl.
B60W 50/14 (2012.01)
G05D 1/00 (2006.01)
(Continued)

(52) U.S. Cl.
CPC .......... *G05D 1/0061* (2013.01); *B60K 35/00* (2013.01); *B60Q 1/50* (2013.01); *B60Q 1/503* (2013.01);
(Continued)

(58) Field of Classification Search
CPC ............... B60W 30/182; B60W 50/14; B60W 2040/0827; B60W 40/08; B60W 50/16;
(Continued)

(56) References Cited

U.S. PATENT DOCUMENTS 9,352,752 B2 * 5/2016 Cullinane ............. B60W 30/00
10,037,236 B2 * 7/2018 Sugiyama ........... G06F 11/0766
(Continued)

FOREIGN PATENT DOCUMENTS

JP 2001-219760 8/2001
JP 2002-251690 9/2002
(Continued)

OTHER PUBLICATIONS

International Search Report of PCT application No. PCT/JP2016/005156 dated Mar. 21, 2017.

*Primary Examiner* — Daniel Previl
(74) *Attorney, Agent, or Firm* — Seed IP Law Group LLP

(57) ABSTRACT

A driving assistance device can be installed in a vehicle in which either an automatic driving mode or a manual driving mode is selected for traveling. A receiving unit receives a switching request for a driving mode. A generating unit generates switching notification information for a switching notice in accordance with the switching request received by the receiving unit. An output unit outputs the switching notification information to a presentation unit that presents, outward from the vehicle, the switching notice indicated by the switching notification information generated by the generating unit.

6 Claims, 10 Drawing Sheets

(51) Int. Cl.
  *B60W 30/182* (2012.01)
  *G06K 9/00* (2006.01)
  *B60Q 1/50* (2006.01)
  *B60K 35/00* (2006.01)

(52) U.S. Cl.
  CPC .......... *B60W 30/182* (2013.01); *B60W 50/14* (2013.01); *G06K 9/00832* (2013.01); *G06K 9/00993* (2013.01); *B60K 2350/2008* (2013.01); *B60W 2050/146* (2013.01); *B60W 2540/00* (2013.01)

(58) Field of Classification Search
  CPC ...... B60K 2350/1096; B60K 2350/352; B60K 35/00; B60R 16/02; B60R 2325/205; B60R 25/102; B60R 25/20; B60R 25/33; G06F 3/14; G06K 9/00798; G06K 9/00818; G08G 1/16; G08G 1/20; H04N 7/183; E02F 9/2054; E02F 9/26; E02F 9/267; G07B 15/00; G07C 5/008; G07C 5/085; G07C 9/0069; G09G 2380/10; H04B 7/1851; G05D 1/0061; G05D 1/0088; G05D 2201/0213

USPC ....... 340/457, 459, 463, 488, 517, 525, 576, 340/691.6, 7.55, 14.69, 384.72
  See application file for complete search history.

(56) References Cited

U.S. PATENT DOCUMENTS

| | | | |
|---|---|---|---|
| 2005/0237927 A1* | 10/2005 | Kano | H04L 45/00 370/216 |
| 2008/0102839 A1* | 5/2008 | Kurokawa | H04W 36/0083 455/439 |
| 2008/0200121 A1* | 8/2008 | Yamamoto | G08G 1/093 455/41.2 |
| 2017/0210232 A1* | 7/2017 | Ichikawa | H02J 7/025 |
| 2017/0225567 A1 | 8/2017 | Tsuda | |

FOREIGN PATENT DOCUMENTS

| | | | |
|---|---|---|---|
| JP | 2014-069671 | | 4/2014 |
| JP | 2014069671 | * | 4/2014 |
| JP | 2015-024746 | | 2/2015 |
| WO | 2016/068273 A1 | | 5/2016 |

* cited by examiner

FIG. 4

| Presentation unit ID | Presentation unit | Automatic driving mode | Manual driving mode |
|---|---|---|---|
| 1 | Color light | Blue | Red |
| 2 | Communication board | Currently in automatic driving | Currently in manual driving |
| 3 | Indicator | Currently in automatic driving with high accuracy: 7<br>Currently in automatic driving with low accuracy: 6 | Currently in manual driving immediately after switching: 2<br>Currently in manual driving: 1 |
| 4 | Side mirror | 0° | 90° |

| Check item | Point |
|---|---|
| Seat position | 2 |
| Seat tilt | 2 |
| Steering position | 3 |
| Steering holding | 5 |

| Presentation unit ID | Presentation unit | First switching | Second switching |
|---|---|---|---|
| 1 | Color light | 10 or more: yellow<br>5 or more: yellow-green<br>Others: green | Yellow-green |
| 2 | Communication board | 10 or more: soon in manual driving<br>5 or more: currently switching to manual driving<br>Others: switching from manual driving | Currently switching to manual driving |
| 3 | Indicator | 10 or more: 3<br>5 or more: 4<br>Others: 5 | 4 |
| 4 | Side mirror | $90° \times \frac{\text{Point}}{12}$ | — |

54

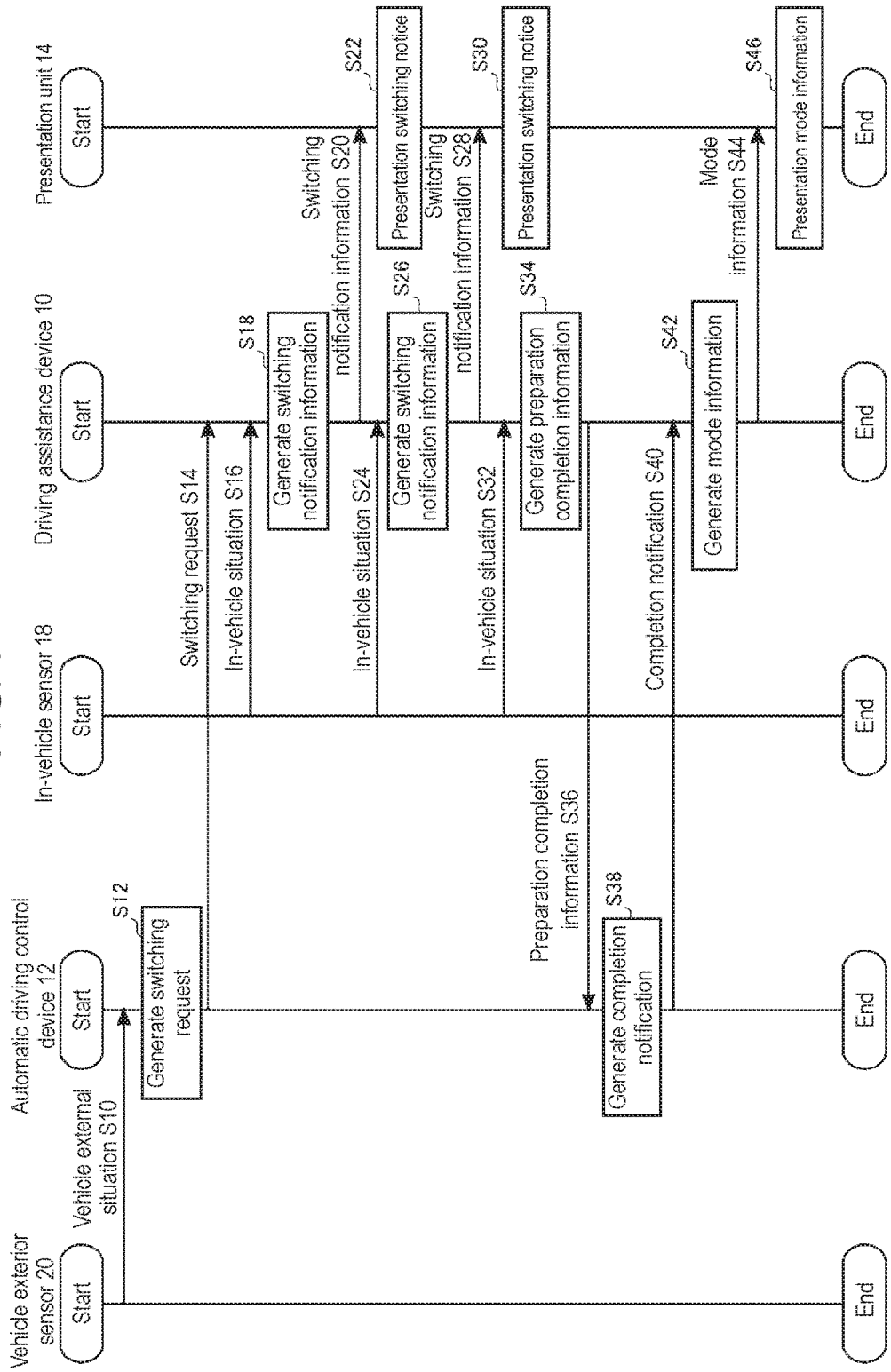

DRIVING ASSISTANCE METHOD, AND DRIVING ASSISTANCE DEVICE, INFORMATION PRESENTATION DEVICE, AND RECORDING MEDIUM USING SAME

This application is a U.S. national stage application of the PCT International Application No. PCT/JP2016/005156 filed on Dec. 16, 2016, which claims the benefit of foreign priority of Japanese patent application No. 2015-252650 filed on Dec. 24, 2015, the contents all of which are incorporated herein by reference.

TECHNICAL FIELD

The present invention relates to a driving assistance technique, and particularly relates to a driving assistance method for presenting information when an automatic driving mode or a manual driving mode is executed, and a driving assistance device, an information presentation device, a vehicle, and a program using the driving assistance method.

BACKGROUND ART

For example, in a vehicle during automatic driving, when a driver performs a driving operation (overrides), a self-driving vehicle control device makes switching from automatic driving to manual driving. In such a vehicle mounted with the self-driving vehicle control device, light-emitting elements installed in at least a part of a whole circumference of a steering wheel emit light to cause a driver to visually recognize that the vehicle is in an automatic driving state (for example, see PTL 1).

CITATION LIST

Patent Literature

PTL 1: Unexamined Japanese Patent Publication No. 2014-69671

SUMMARY OF THE INVENTION

The present invention provides a technique that notifies switching of a driving mode selected in the vehicle.

A driving assistance device according to a certain aspect of the present invention is a driving assistance device that can be installed in a vehicle in which a driving mode is selected from either an automatic driving mode or a manual driving mode for execution. This device includes a receiving unit, a generating unit, and an output unit. The receiving unit receives a request to switch the driving mode. The generating unit generates switching notification information in accordance with the switching request received by the receiving unit. The output unit outputs the switching notification information to a presentation unit that presents, outward from the vehicle, a switching notice indicated by the switching notification information.

Another aspect of the present invention provides an information presentation device that can be installed in a vehicle in which a driving mode is selected from either an automatic driving mode or a manual driving mode for execution. This device includes a receiving unit, a generating unit, an output unit, and a presentation unit. The receiving unit receives a request to switching the driving mode. The generating unit generates switching notification information in accordance with the switching request received by the receiving unit. The output unit outputs the switching notification information generated by the generating unit. The presentation unit presents, outward from the vehicle, a switching notice indicated by the switching notification information output from the output unit.

A still another aspect of the present invention provides a vehicle in which a driving mode is selected from either an automatic driving mode or a manual driving mode for traveling. The vehicle includes a vehicle body and an information presentation device installed in the vehicle. The information presentation device includes a receiving unit, a generating unit, an output unit, and a presentation unit. The receiving unit receives a request to switching the driving mode. The generating unit generates switching notification information in accordance with the switching request received by the receiving unit. The output unit outputs the switching notification information generated by the generating unit. The presentation unit presents, outward from the vehicle body, a switching notice indicated by the switching notification information output from the output unit.

A still another aspect of the present invention provides a driving assistance method in a driving assistance device that can be installed in a vehicle in which a driving mode is selected from either an automatic driving mode or a manual driving mode for traveling. In this method, a request to switch the driving mode is received. Switching notification information for notifying switching is generated in accordance with the received switching request. The generated switching notification information is then output to a presentation unit that presents, outward from the vehicle, a switching notice indicated by the switching notification information.

Any desired combinations of the above described components and modifications of the features of the present invention in devices, systems, methods, programs, recording media containing the programs, or other entities are still effective as other aspects of the present invention.

According to the present invention, switching of the driving mode selected in the vehicle can be notified.

BRIEF DESCRIPTION OF DRAWINGS

FIG. 4 is a diagram illustrating a data structure of a table stored in a storage unit in FIG. 1.

FIG. 5 is a diagram illustrating a data structure of another table stored in the storage unit in FIG. 1.

FIG. 6 is a diagram illustrating a data structure of still another table stored in the storage unit in FIG. 1.

FIG. 7 is a sequence diagram illustrating a presentation procedure by the vehicle in FIG. 1.

DESCRIPTION OF EMBODIMENTS

Figure 1:
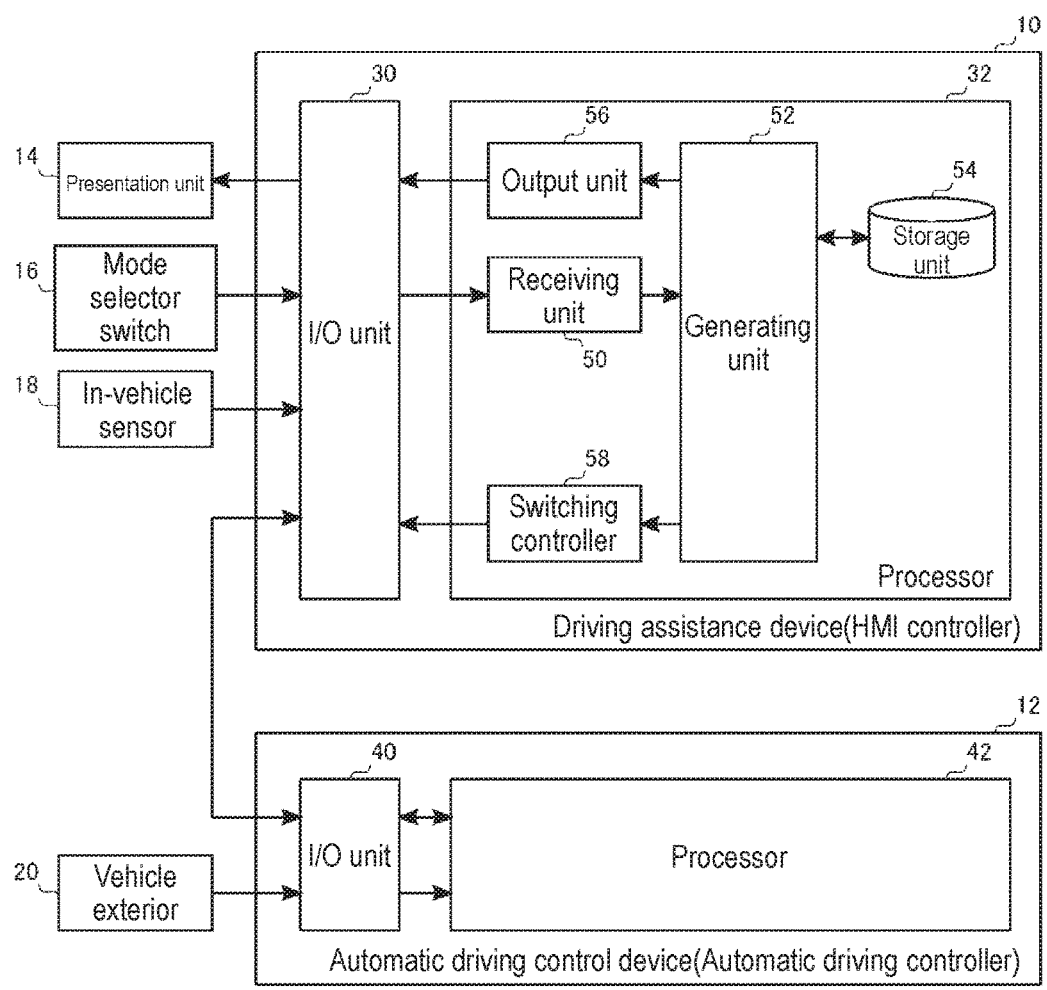
FIG. 1 is a diagram illustrating a configuration of a vehicle according to an exemplary embodiment of the present invention.

Prior to description of an exemplary embodiment of the present invention, problems found in a conventional technique will now briefly be described herein. In general, a person outside a vehicle is not notified of whether the vehicle mounted with a self-driving vehicle control device is being automatically driven.

However, it is preferable that the person outside the vehicle in which a driving mode is selected from either an automatic driving mode or a manual driving mode for traveling can recognize the driving mode selected in the vehicle. Further, it is preferable that the person outside the vehicle can recognize also switching of the driving mode.

Prior to specific description of the present invention, an outline of a present exemplary embodiment will be described. The exemplary embodiment of the present invention relates to a driving assistance device in a vehicle that can run in an automatic driving mode and a manual driving mode. In the vehicle, a driving mode is selected from either the automatic driving mode or the manual driving mode for traveling. Herein, an object is to present the selected driving mode and also a driving mode switching notice to the outside of the vehicle and present. The switching of the driving mode includes switching from the automatic driving mode to the manual driving mode (hereinafter, "first switching") and switching from the manual driving mode to the automatic driving mode (hereinafter, "second switching"). In the first switching, the switching cannot be completed when a preparation for a driving operation by a driver such as an operation for holding a steering is not sufficient. In the second switching, the switching can be completed regardless of the preparation for the driving operation by the driver. For this reason, a condition of the operation mode switching notice is greatly different between the first switching and the second switching.

In the driving assistance device according to the present exemplary embodiment, when the automatic driving mode is selected and the switching to the manual driving mode is requested, a sensor installed in the vehicle (hereinafter, "in-vehicle sensor") detects a driver's state. Further, the driving assistance device derives, based on the detected state, a degree that the driver finishes preparing for the driving operation, and presents a notice to the outside of the vehicle so that the derived degree is indicated. That is, a period of time until which the switching to the manual driving mode is completed is different between a case where the driver does not finish preparing for the driving operation and a case where the driver finishes preparing for the driving operation. For this reason, the difference is presented clearly. In the driving assistance device, when completion of a preparation for the driving operation by the driver is recognized, the vehicle is switched to the manual driving mode. On the other hand, when the switching to the automatic driving mode is requested during the selected manual driving mode, the driving assistance device presents a notice to the outside of the vehicle. Thereafter, the vehicle is switched to the automatic driving mode.

FIG. 1 illustrates a configuration of vehicle 100 according to the exemplary embodiment of the present invention, and particularly illustrates a configuration relating to the automatic driving. Vehicle 100 includes driving assistance device (human-machine interface (HMI) controller) 10, automatic driving control device (automatic driving controller) 12, presentation unit 14, mode selector switch 16, in-vehicle sensor 18, and vehicle exterior sensor 20. Driving assistance device 10 includes input and output unit (I/O unit) 30, and processor 32. Processor 32 includes receiving unit 50, generating unit 52, storage unit 54, output unit 56, and switching controller 58. Automatic driving control device 12 includes I/O unit 40 and processor 42. A combination of driving assistance device 10 and presentation unit 14 configures an information presentation device.

Presentation unit 14 presents a driving mode selected in vehicle 100 so that the driving mode is recognized from outside vehicle 100. Further, presentation unit 14 presents that the first switching or the second switching is being performed so that the switching is recognized from outside vehicle 100. Information about contents to be presented by presentation unit 14 is supplied from driving assistance device 10. The information to be supplied from driving assistance device 10 will be described later. Herein, various forms of presentation unit 14 will be described.

Figure 2A:
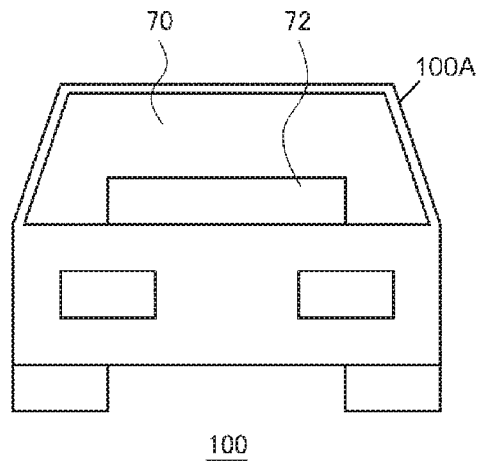
FIG. 2A is an external view when the vehicle is viewed from a rear side according to the exemplary embodiment of the present invention.
Figure 2B:
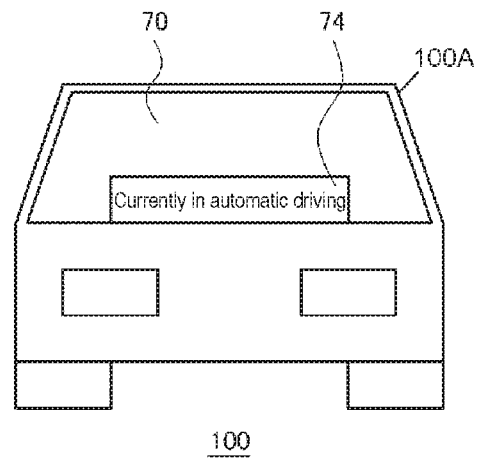
FIG. 2B is an external view when another vehicle is viewed from a rear side according to the exemplary embodiment of the present invention.
Figure 2C:
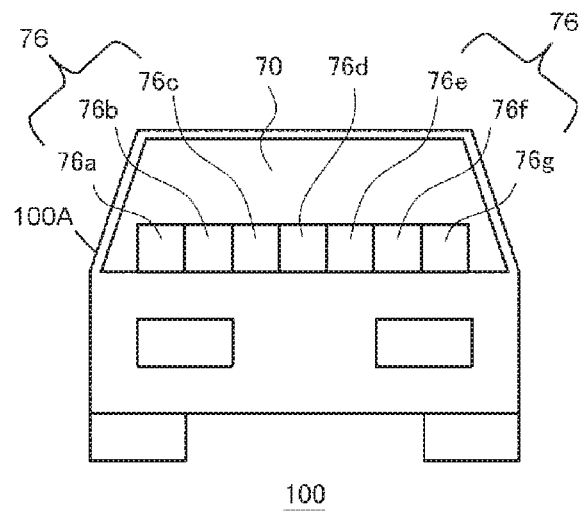
FIG. 2C is an external view when still another vehicle is viewed from a rear side according to the exemplary embodiment of the present invention.

FIG. 2A to FIG. 2C are external views when vehicle 100 is viewed from a rear side. In FIG. 2A, rear window 70 is disposed on a rear part of vehicle 100, and color light 72 is disposed in rear window 70. Color light 72 may be disposed on a portion of a vehicle body other than rear window 70. Color light 72 is one example of presentation unit 14, and emits light outward from vehicle 100. That is, the light emission corresponds to the above-described present. Color light 72 emits light of various colors and to indicate the automatic driving mode, the manual driving mode, the first switching current in execution, or the second switching current in execution in accordance with the light colors. In FIG. 2B, communication board 74 is disposed in rear window 70. Communication board 74 may be disposed in a portion of the vehicle body other than rear window 70. Communication board 74 is another example of presentation unit 14, and presents characters outward from vehicle 100. That is, the present of characters corresponds to the above-described present. In accordance with contents of characters, the automatic driving mode, the manual driving mode, the first switching current in execution, or the second switching current in execution is presented. In either case, presentation unit 14 presents a switching notice outside vehicle 100, namely, outward from vehicle body 100A.

In FIG. 2C, first indicator 76a, second indicator 76b, third indicator 76c, fourth indicator 76d, fifth indicator 76e, sixth indicator 76f, and seventh indicator 76g are disposed in rear window 70. Hereinafter, first indicator 76a to seventh indicator 76g are generally referred to as indicators 76.

Indicators 76 may be disposed on a portion of the vehicle body other than rear window 70. Indicators 76 are one example of presentation unit 14, and emit light outward from vehicle 100. That is, the light emission corresponds to the above-described present. In accordance with a number of indicators 76 to light and a change in the number, the automatic driving mode, the manual driving mode, the first switching current in execution, or the second switching current in execution is presented.

Figure 3:
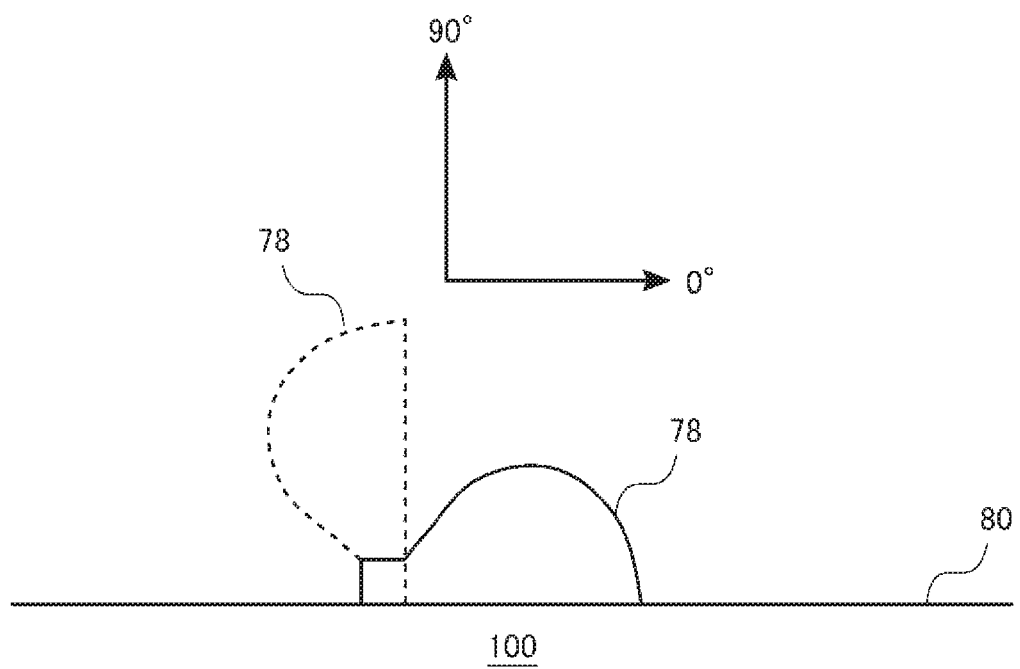
FIG. 3 is an external view when the vehicle is viewed from a side according to the exemplary embodiment of the present invention.

FIG. 3 is an external view when vehicle 100 is viewed from a side. A lower part of the drawing illustrates body 80, and side mirror 78 is disposed in body 80. Side mirror 78 is openable about an axis in a height-wise direction of vehicle 100. In FIG. 3, side mirror 78 in a close state is indicated by a sold line, and side mirror 78 in an open state is indicated by a dotted line. Herein, side mirror 78 in the close state has an angle of "0°", and side mirror 78 in the open state has an angle of "90°". That is, the angle of side mirror 78 and a change in the angle correspond to the above-described present. In accordance with the angle of side mirror 78, the automatic driving mode or the manual driving mode is indicated. The first switching current in execution is indicated by the change in the angle.

In FIG. 1, mode selector switch 16 is a switch to be operated by a driver, and is a switch for switching the driving mode from the automatic driving mode to the manual driving mode. A switching signal from mode selector switch 16 is transmitted to driving assistance device 10 via a signal line. Mode selector switch 16 is not provided, and a configuration may be such that the mode can be switched by a specific operation on a steering (not illustrated). For example, in the automatic driving mode, an operation for rotating the steering to a predetermined direction by a predetermined amount or more may be the operation for switching from the automatic driving mode to the manual driving mode.

Vehicle exterior sensor 20 is a general name of various type of sensors that detect a vehicle exterior situation and a state of vehicle 100. As the sensor for detecting a vehicle exterior situation, for example, a camera, a millimeter-wave radar, a light detection and ranging, laser imaging detection and ranging (LIDAR), a temperature sensor, an atmospheric pressure sensor, a humidity sensor, and illuminance sensor are installed. The vehicle exterior situation includes a situation, including lane information, of a road where a self-vehicle travels, environments including weather, a self-vehicle surrounding situation, and other vehicles near the self-vehicle (other vehicles that travel in an adjacent lane). Any information may be included as long as the information is vehicle exterior information that can be detected by the sensor. Further, as the sensor that detects the state of vehicle 100, for example, an acceleration sensor, a gyroscope sensor, a geomagnetism sensor, and an inclination sensor are installed. Vehicle exterior sensor 20 output a detection result to automatic driving control device 12.

Automatic driving control device 12 is an automatic driving controller mounted with an automatic driving control function. I/O unit 40 executes various types of communication control corresponding to various types of communication formats. A configuration of processor 42 can be implemented by cooperation of hardware resources and software resources or only hardware resources (a dedicated circuit). Hardware resources that can be used include a processor, a read only memory (a ROM), a random access memory (a RAM), and other large scale integration circuits (LSIs). Software resources that can be used include programs such as an operating system, applications, and firmware. Processor 42 inputs the detection result from vehicle exterior sensor 20 via I/O unit 40, and executes the automatic driving control function based on the detection result.

In-vehicle sensor 18 is a sensor for detecting states of a driver's seat and a driver. For example, in-vehicle sensor 18 detects a position and a tilt of the seat. Further, when vehicle 100 is in the automatic driving mode in a configuration where unnecessary steering is stored, in-vehicle sensor 18 may detect whether the steering is stored. Further, in-vehicle sensor 18 may detect whether the driver holds the steering. In in-vehicle sensor 18 that makes such detection, a publicly-known technique may be used, and thus description thereof is omitted herein. Further, in-vehicle sensor 18 may be a camera that can image a periphery of the driver's seat. In this case, the states of the driver's seat and the driver are detected in an image recognition process, based on the captured image. In-vehicle sensor 18 outputs a detection result to driving assistance device 10.

Driving assistance device 10 is a human machine interface (HMI) controller that executes an interface function between vehicle 100 and the driver and a determination function for the driving mode. Processor 32 can be implemented by cooperation between hardware resources and software resources or by only hardware resources. Hardware resources that can be used include a processor, a ROM, a RAM, and other LSIs. Software resources that can be used include programs such as an operating system, applications, and firmware. I/O unit 30 executes various types of communication control corresponding to various types of communication formats. When receiving a switching request as a switching signal from mode selector switch 16, I/O unit 30 outputs the switching signal to processor 32. Further, when receiving the detection result from in-vehicle sensor 18, I/O unit 30 outputs the detection result to processor 32. Further, when receiving mode information or switching notification information from processor 32, I/O unit 30 outputs the mode information or the switching notification information to presentation unit 14.

Driving assistance device 10 is directly connected to automatic driving control device 12 by a signal line. These devices may be connected to each other via a controller area network (CAN). Further, driving assistance device 10 and automatic driving control device 12 may be integrated into one controller.

A present process in the first switching and a present process in the second switching will be described below based on the above-described configuration. Herein, the first switching and the second switching are activated by a driver's operation on mode selector switch 16 (hereinafter, "manual activation") or by a process in automatic driving control device 12 (hereinafter, "automatic activation"). For this reason, (1) first switching (automatic activation), (2) first switching (manual activation), (3) second switching (automatic activation), and (4) second switching (manual activation) will be described in this order.

(1) First Switching (Automatic Activation)

Herein, the process before the switching, the process during the switching, and the process after the switching in the first switching will be described in this order. The process before the switching will be described first. Before the first switching, the automatic driving mode is selected in automatic driving control device 12. When a preparation for traveling in the automatic driving mode is completed and the traveling in the automatic driving mode is started, processor 42 of automatic driving control device 12 outputs notification about completion of the switching to the automatic driving mode (hereinafter, "completion notification") to driving assistance device 10 via I/O unit 40. Receiving unit 50 of driving assistance device 10 receives the completion notification via I/O unit 30. Receiving unit 50 outputs the completion notification to generating unit 52. When receiving the completion notification from receiving unit 50, generating unit 52 checks that the completion notification indicates the completion of the switching to the automatic operation mode. After the checking, generating unit 52 generates information indicating the automatic driving mode (hereinafter, "mode information") with reference to a stable stored in storage unit 54.

Storage unit 54 stores the table to be seen in generating unit 52. FIG. 4 illustrates a data structure of the table stored in storage unit 54. This table includes a "presentation unit identification (ID)" field, a "presentation unit" field, an "automatic driving mode" field, and a "manual driving mode" field. The "presentation unit" field shows above-described color light 72, communication board 74, and indicators 76, and side mirror 78 as a configuration of presentation unit 14. The "presentation unit ID" field shows IDs for identifying color light 72, communication board 74, indicators 76, and side mirror 78 as presentation unit 14. For example, presentation unit ID of color light 72 is set to "1".

When the switching of the driving mode is completed, the "automatic driving mode" field shows a content to be included in mode information. For example, the mode information indicates "blue" for color light 72. On the other hand, when the switching of the driving mode is completed, the "manual driving mode" field shows a content to be included in the mode information. For example, the mode information for color light 72 indicates "red".

When generating unit 52 illustrated in FIG. 1 uses color light 72 as presentation unit 14 as illustrated in FIG. 2A, the mode information includes presentation unit ID "1" and an instruction "blue". Further, when communication board 74 or indicators 76 is used as presentation unit 14 as illustrated in FIG. 2B and FIG. 2C, and also when side mirror 78 is used as illustrated in FIG. 3, generating unit 52 generates mode information similarly. Generating unit 52 outputs the mode information to output unit 56.

Output unit 56 receives the mode information from generating unit 52. Output unit 56 outputs the mode information to presentation unit 14 via I/O unit 30. At this time, output unit 56 determines an output destination of the mode information in accordance with the presentation unit ID included in the mode information. For example, when presentation unit ID is "1", output unit 56 outputs the mode information to color light 72.

When receiving the mode information from driving assistance device 10, presentation unit 14 executes a process according to an instruction included in the mode information, namely, present outward from vehicle 100. For example, in a case where presentation unit 14 is color light 72, color light 72 lights blue in accordance with the instruction "blue" included in the mode information. Further, communication board 74 presents a sign "be in automatic driving", and side mirror 78 is set to "0°", namely, is closed.

Further, seven indicators 76 including first indicator 76a to seventh indicator 76g are lighted or six indicators 76 including first indicator 76a to sixth indicator 76f are lighted. When seven indicators 76 are lighted, automatic driving control device 12 is performing automatic driving with high accuracy. When the six indicators 76 are lighted, automatic driving control device 12 performs automatic driving with low accuracy. In discrimination between the automatic driving with high accuracy and the automatic driving with low accuracy, a publicly-known technique may be used. For example, the discrimination is made whether a white line on an image captured by the in-vehicle camera, not illustrated, (for example, a lane edge) is recognized easily or difficultly. Information about the discrimination between the automatic driving with high accuracy and the automatic driving with low accuracy is also included in the above-described completion notification. Generating unit 52 uses also this information to generate mode information.

Switching currently in execution will be described below. In a vehicle that is traveling in the automatic driving mode, visibility of white lines is occasionally deteriorated due to, for example, bad weather. In such a case, processor 42 of automatic driving control device 12 determines that, based on a detection result from vehicle exterior sensor 20, continuation of the automatic driving mode is difficult and thus the switching to the manual driving mode is necessary. After the determination, processor 42 outputs a request to switch from the automatic driving mode to the manual driving mode (hereinafter, "switching request") to driving assistance device 10 via I/O unit 40. Receiving unit 50 of driving assistance device 10 receives the switching request via I/O unit 30. Receiving unit 50 outputs the switching request to generating unit 52.

When receiving the switching request from receiving unit 50, generating unit 52 derives a degree of completion of the preparation for the driving operation by the driver. The degree of completion of the preparation is indicated as a point. Derivation of the point in generating unit 52 will be described herein. Generating unit 52 derives the point from the detection result from in-vehicle sensor 18 and the table stored in storage unit 54. FIG. 5 illustrates a data structure of another table stored in storage unit 54. This table includes a "check item" field and a "point" field. The "check item" field shows items for checking whether the driver completes the preparation for the driving operation. As the "seat position", a position of the driver's seat suitable for driving by the driver is set. When the driver's seat shifts from the seat position to be extremely separated from or close to a steering, an accelerator pedal, or a brake pedal, it is difficult for the driver to perform the driving operation. For this reason, it is difficult for the vehicle to travel in the manual driving mode.

As the "seat tilt", a tilt of a backrest of the driver's seat is determined so as to be suitable for the manual driving mode. When the backrest of the driver's seat deviates from the seat tilt to extremely tilt forward or backward, a range of driver's motion becomes narrow or driver's front view becomes difficult. Therefore, the driving operation by the driver becomes difficult. For this reason, it is difficult for the vehicle to travel in the manual driving mode. In a "steering position", in a case of a configuration such that the steering can be stored, a setting is such that the steering is not stored to be exposed. When the steering is stored, the driver cannot perform the driving operation, and thus it is difficult for the vehicle to travel in the manual driving mode. In "steering holding", a setting is such that the driver holds the steering. When the steering is not held, the driver cannot perform the driving operation, and thus it is difficult for the vehicle to travel in the manual driving mode.

When the detection result from in-vehicle sensor 18 corresponds to the "check item" in the table, generating unit 52 illustrated in the FIG. 1 extracts a point shown in the "point" field in FIG. 5. Further, generating unit 52 sums extracted points. Further, generating unit 52 refers to the table (FIG. 6) stored in storage unit 54 based on the summed point to derive information about the degree of the completion of preparation for the driving operation by the driver.

FIG. 6 illustrates a data structure of still another table stored in storage unit 54. This table includes the "presentation unit ID" field, "the "presentation unit" field, a "first switching field", and the "second switching" field. The "presentation unit ID" field and the "presentation unit" field are similar to those in FIG. 4. The "first switching" field is seen in the first switching. For example, in a case where presentation unit 14 is color light 72, generating unit 52 selects "yellow" when the summed point is "10 or more", selects "yellow green" when the summed point is "5 or more", and selects "green" when the summed point is "any point other than the above two points".

Further, in a case where presentation unit 14 is communication board 74, generating unit 52 selects "the manual driving before long" when the summed point is 10 or more, selects "currently switching to the manual driving" when the summed point is 5 or more, and selects "switching from the automatic driving" when the summed point is any point other than the above two points. Furthermore, in a case where presentation unit 14 is indicators 76, generating unit 52 selects "three" when the summed point is 10 or more, selects "four" when the summed point is 5 or more, and selects "five" when the summed point is any point other than the above two points. In a case where presentation unit 14 is side mirror 78, generating unit 52 calculates an angle in accordance with 90°×(summed point number)/12. The "second switching" field is seen in the second switching, but description thereof is omitted.

Generating unit 52 illustrated in FIG. 1 generates switching notification information, including information indicating the degree of the completion of a preparation for the driving operation by the driver. The switching notification information is information for notifying switching. Herein, in the case where color light 72 is used as presentation unit 14, generating unit 52 causes the switching notification information to include presentation unit ID "1" and an instruction "yellow". Further, also in the cases where communication board 74, indicators 76, and side mirror 78 are used as presentation unit 14, generating unit 52 generates the switching notification information similarly. Generating unit 52 generates the switching notification information in a mode according to present unit 14. Generating unit 52 outputs the switching notification information to output unit 56.

Output unit 56 outputs the switching notification information to presentation unit 14 via I/O unit 30. At this time, output unit 56 determines an output destination of the switching notification information in accordance with the presentation unit ID included in the switching notification information. For example, when presentation unit ID is "1", output unit 56 outputs the switching notification information to color light 72.

When receiving the switching notification information from driving assistance device 10, presentation unit 14 executes a process according to the instruction included in the switching notification information, namely, performs presentation outward from vehicle 100. For example, in the case where presentation unit 14 is color light 72, color light 72 lights yellow in accordance with the instruction "yellow" included in the mode information. Further, communication board 74 presents a sign such as "the manual driving before long", and side mirror 78 maintains an instructed angle.

Herein, when "three" indicators 76 are instructed to light, first indicator 76a to third indicator 76c are lighted. "Four" indicators 76 are instructed to light, first indicator 76a to fourth indicator 76d are lighted. Furthermore, "five" indicators 76 are instructed to light, first indicator 76a to fifth indicator 76e are lighted. That is, indicators 76 closer to first indicator 76a take priority in lighting over indicators 76 closer to seventh indicator 76g.

Generating unit 52 derives a point based on the above-described process, namely, the detection result from vehicle exterior sensor 20, and generates the switching notification information. The process to be executed by presentation unit 14 in accordance with the switching notification information is repeated until the point is "12", namely, has a maximum point. At this time, since the detection result from vehicle exterior sensor 20 is updated, the point is also updated, and the present by presentation unit 14 is also updated.

Finally, the process after the switching will be described. Generating unit 52 generates information indicating that the driver completes the preparation for the driving operation (hereinafter, "preparation completion information") when the point is "12". Generating unit 52 outputs the preparation completion information to switching controller 58. When receiving the preparation completion information from generating unit 52, switching controller 58 outputs the preparation completion information to automatic driving control device 12 via I/O unit 30.

When receiving the preparation completion information from driving assistance device 10 via I/O unit 40, processor 42 switches the driving mode from the automatic driving mode to the manual driving mode. When the switching to the manual driving mode is completed, processor 42 outputs notification indicating the completion of the switching to the manual driving mode (hereinafter, this is also referred to as "completion notification" to driving assistance device 10 via I/O unit 40. A process in the case where driving assistance device 10 receives the completion notification is similar to the process to be executed on the completion notification received when the above-described switching to the automatic driving mode is completed. A difference from the above description will be mainly described below. When receiving the completion notification from receiving unit 50, generating unit 52 check that the completion notification indicates the completion of the switching to the manual driving mode. After the check, generating unit 52 generates information indicating the manual driving mode (hereinafter, this is also referred to as "mode information") with reference to the table stored in storage unit 54.

At this time, generating unit 52 sees the "manual driving mode" field in the table illustrated in FIG. 4. Therefore, in the case where color light 72 is used as presentation unit 14, generating unit 52 makes the mode information include the presentation unit ID "1" and the instruction "red". Further, also in the cases where communication board 74, indicators 76, and side mirror 78 are used as presentation unit 14, generating unit 52 generates the mode information similarly. Generating unit 52 outputs the mode information to output unit 56.

When receiving the mode information from driving assistance device 10, presentation unit 14 executes a process according to an instruction included in the mode information, namely, present outward from vehicle 100. For example, in the case where presentation unit 14 is color light 72, color light 72 lights red in accordance with the instruction "red" included in the mode information. Further, communication board 74 presents a sign "currently in manual driving". Side mirror 78 has already set to "90°", namely, has been opened.

Further, two indicators 76 including first indicator 76a and second indicator 76b are lighted, or only first indicator 76a is lighted. Two indicators 76 are lighted immediately after the switching to the manual driving mode, and one indicator 76 is lighted when a predetermined time period elapses after the switching to the manual driving mode. Therefore, two indicators 76 may be lighted for a predetermined time period immediately after the switching to the manual driving mode by the first switching, for example, for one minute, and then one indicator 76 may be lighted.

(2) First Switching (Manual Activation)

Since a process before the switching is similar to the process (1), description thereof is omitted, and thus as to the process during the switching, a difference from process (1) will be mainly described. In the vehicle that is traveling in the automatic driving mode, when a driver operates mode selector switch 16 so that mode selector switch 16 outputs a request to switch from the automatic driving mode to the manual driving mode (hereinafter, this is also referred to as "switching request") to driving assistance device 10.

Receiving unit 50 of driving assistance device 10 receives the switching request via I/O unit 30. Receiving unit 50 outputs the switching request to generating unit 52. Subsequent processes in generating unit 52, output unit 56, and presentation unit 14 are similar to process (1).

A process after the switching will be described below. Generating unit 52 generates information indicating that the driver completes the preparation for the driving operation (hereinafter, "preparation completion information") when the point is "12". Differently from the process (1), automatic driving control device 12 does not determine necessity of the switching from the automatic driving mode to the manual driving mode. For this reason, the preparation completion information here can be said to be a switching instruction to automatic driving control device 12. Generating unit 52 outputs the preparation completion information to switching controller 58. Subsequent processes are similar to process (1).

(3) Second Switching (Automatic Activation)

A process before the switching is similar to the process after the switching process (1). That is, before the switching to the second switching, the manual driving mode is selected in automatic driving control device 12. The process during the switching will be described below. In the vehicle that is traveling in the manual driving mode, white lanes that have not been recognized can be recognized due to, for example, better weather. In such a case, processor 42 of automatic driving control device 12 determines that, based on a detection result from vehicle exterior sensor 20, the vehicle can travel in the automatic driving mode and can be switched to automatic driving mode. After the determination, processor 42 outputs a request to switch from the manual driving mode to the automatic driving mode (hereinafter, this is also referred to as "switching request") to driving assistance device 10 via I/O unit 40. Receiving unit 50 of driving assistance device 10 receives the switching request via I/O unit 30. In such a manner, receiving unit 50 can receive the request to switch from one driving mode to the other driving mode. Receiving unit 50 outputs the switching request to generating unit 52.

When receiving the switching request from receiving unit 50, generating unit 52 generates information to be presented on presentation unit 14 with reference to storage unit 54. In this case, the "second switching" field in FIG. 6 is used. For example, in the case where presentation unit 14 is color light 72, generating unit 52 selects "yellow green". Further, in the case where presentation unit 14 is communication board 74, generating unit 52 selects "currently switching to the automatic driving". Further, in the case where presentation unit 14 is indicators 76, generating unit 52 selects "4". In the second switching, side mirror 78 is not used as presentation unit 14. The description returns to FIG. 1.

Generating unit 52 generates switching notification information including information about an instruction. The switching notification information is information for notifying the switching. Herein, in the case where color light 72 is used as presentation unit 14, generating unit 52 causes the switching notification information to include presentation unit ID "1" and the instruction "yellow green". Further, also in cases where communication board 74 and indicators 76 are used as presentation unit 14, generating unit 52 generates the switching notification information similarly. Generating unit 52 generates the switching notification information in a mode according to presentation unit 14. Generating unit 52 outputs the switching notification information to output unit 56.

When receiving the switching notification information from driving assistance device 10, presentation unit 14 performs present outside vehicle 100 in accordance with the instruction included in the switching notification information. For example, in the case where presentation unit 14 is color light 72, color light 72 lights yellow green in accordance with the instruction "yellow green" included in the mode information. Further, communication board 74 presents a text "currently switching to the automatic driving", and indicators 76 including first indicator 76a to fourth indicator 76d are lighted.

Finally, the process after the switching will be described. Processor 42 outputs the above-described switching request and switches the manual driving mode to the automatic driving mode. When the switching to the automatic driving mode is completed, processor 42 outputs notification indicating the completion of the switching to the automatic driving mode (hereinafter, this is also referred to as "completion notification" to driving assistance device 10 via I/O unit 40. Receiving unit 50 of driving assistance device 10 receives the switching request and then the completion notification. When receiving unit 50 receives the completion notification, generating unit 52 generates mode information indicating the automatic driving mode similarly to (1) the process before switching. Output unit 56 outputs the mode information generated by generating unit 52 to presentation unit 14 via I/O unit 30. As a result, presentation unit 14 presents the automatic driving mode outward from vehicle 100. This corresponds to causing presentation unit 14 to stop the present of the switching notice indicated by the switching notification information.

(4) Second Switching (Manual Activation)

Since the process before the switching is similar to the process (3), description thereof will be omitted, and thus as to a process during the switching, a difference from process (3) will be manly described. In the vehicle that is traveling in manual driving mode, a driver operates mode selector switch 16 so that mode selector switch 16 outputs a request to switch from the manual driving mode to the automatic driving mode (hereinafter, this is also referred to as "switching request") to driving assistance device 10. Receiving unit 50 of driving assistance device 10 receives the switching request via I/O unit 30. Receiving unit 50 outputs the switching request to generating unit 52. Subsequent processes in generating unit 52, output unit 56, and presentation unit 14 are similar to process (3).

The process after the switching will be described below. Generating unit 52 generates switching notification information and information indicating that a driver completes the preparation for the driving operation (hereinafter, "preparation completion information"). Since automatic driving control device 12 does not determine switching from the manual driving mode to the automatic driving mode, the preparation completion information here can be said to be a switching instruction to automatic driving control device 12. Generating unit 52 outputs the preparation completion information to switching controller 58. When receiving the preparation completion information from driving assistance device 10 via I/O unit 40, processor 42 of automatic driving control device 12 switches the manual driving mode to the automatic driving mode. Subsequent processes are similar to process (3).

An operation of vehicle 100 configured as described above will be described. FIG. 7 is a sequence diagram illustrating a presentation procedure by vehicle 100. This sequence corresponds to the process (1). Vehicle exterior sensor 20 outputs a vehicle exterior situation to automatic driving control device 12 (S10). Automatic driving control device 12 generates a switching request (S12), and outputs the switching request to driving assistance device 10 (S14). In-vehicle sensor 18 outputs an in-vehicle situation to driving assistance device 10 (S16). Driving assistance device 10 generates switching notification information (S18). Driving assistance device 10 outputs the switching notification information to presentation unit 14 (S20). Presentation unit 14 then presents the switching notification information (S22).

In-vehicle sensor 18 outputs the in-vehicle situation to driving assistance device 10 (S24). Driving assistance device 10 generates switching notification information (S26). Driving assistance device 10 outputs the switching notification information to presentation unit 14 (S28). Presentation unit 14 then presents the switching notification information (S30). In-vehicle sensor 18 outputs the in-vehicle situation to driving assistance device 10 (S32). Driving assistance device 10 generates preparation completion information (S34), and outputs the preparation completion information to automatic driving control device 12 (S36). Automatic driving control device 12 generates a completion notification (S38), and outputs the completion notification to driving assistance device 10 (S40). Driving assistance device 10 generates mode information (S42), and outputs the mode information to presentation unit 14 (S44). Presentation unit 14 presents the mode information (S46).

Figure 8:
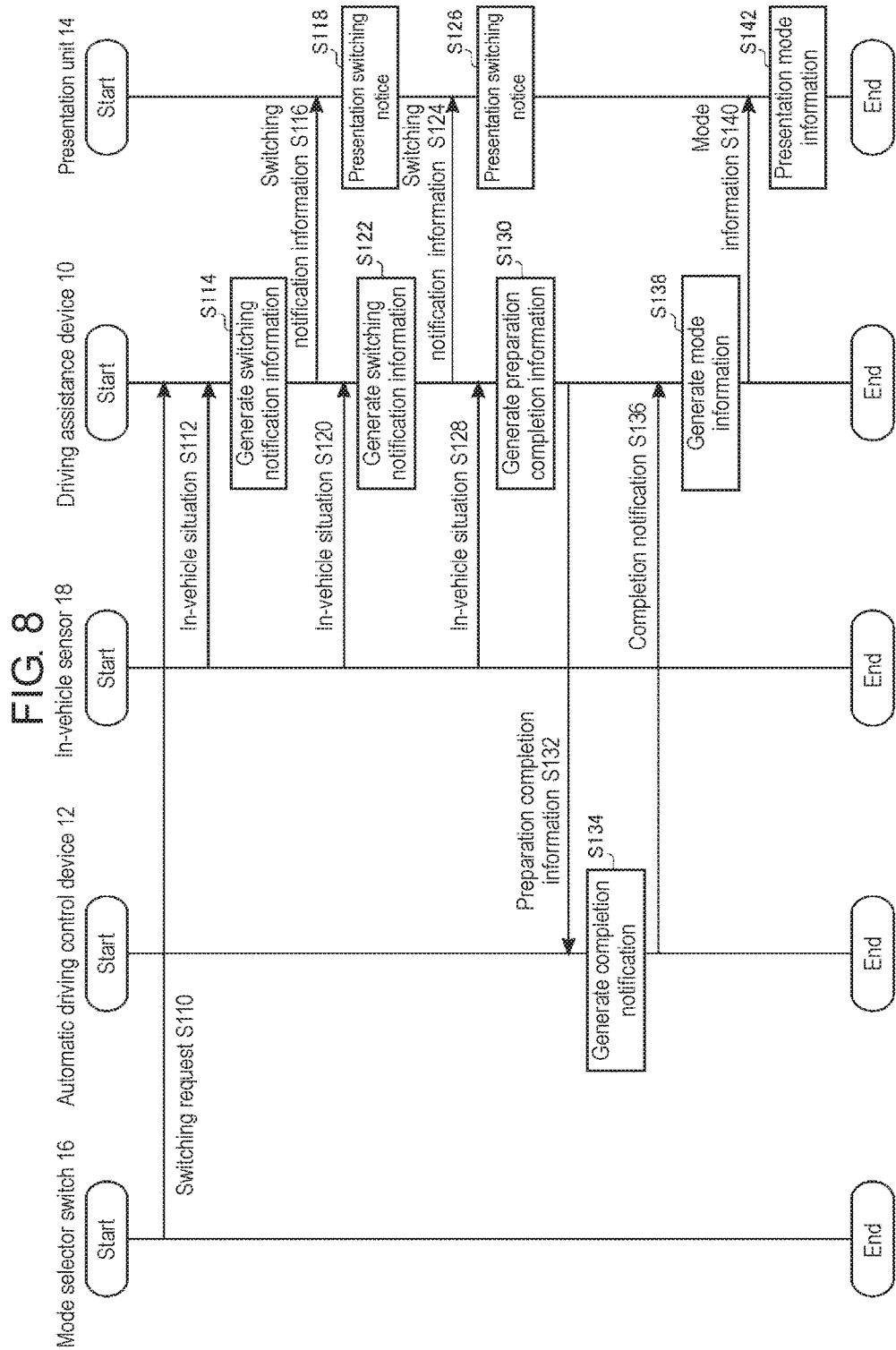
FIG. 8 is a sequence diagram illustrating another presentation procedure by the vehicle in FIG. 1.

FIG. 8 is a sequence diagram illustrating another presentation procedure by vehicle 100. This sequence corresponds to the process (2). Mode selector switch 16 outputs the switching request to driving assistance device 10 (S110). In-vehicle sensor 18 outputs the in-vehicle situation to driving assistance device 10 (S112). Driving assistance device 10 generates switching notification information (S114). Driving assistance device 10 outputs the switching notification information to presentation unit 14 (S116). Presentation unit 14 then presents the switching notification information (S118). In-vehicle sensor 18 outputs the in-vehicle situation to driving assistance device 10 (S120). Driving assistance device 10 generates the switching notification information (S122). Driving assistance device 10 outputs the switching notification information to presentation unit 14 (S124). Presentation unit 14 then presents the switching notification information (S126).

In-vehicle sensor 18 outputs the in-vehicle situation to driving assistance device 10 (S128). Driving assistance device 10 generates preparation completion information (S130), and outputs the preparation completion information to automatic driving control device 12 (S132). Automatic driving control device 12 generates a completion notification (S134), and outputs the completion notification to driving assistance device 10 (S136). Driving assistance device 10 generates mode information (S138), and outputs the mode information to presentation unit 14 (S140). Presentation unit 14 presents the mode information (S142).

Figure 9:
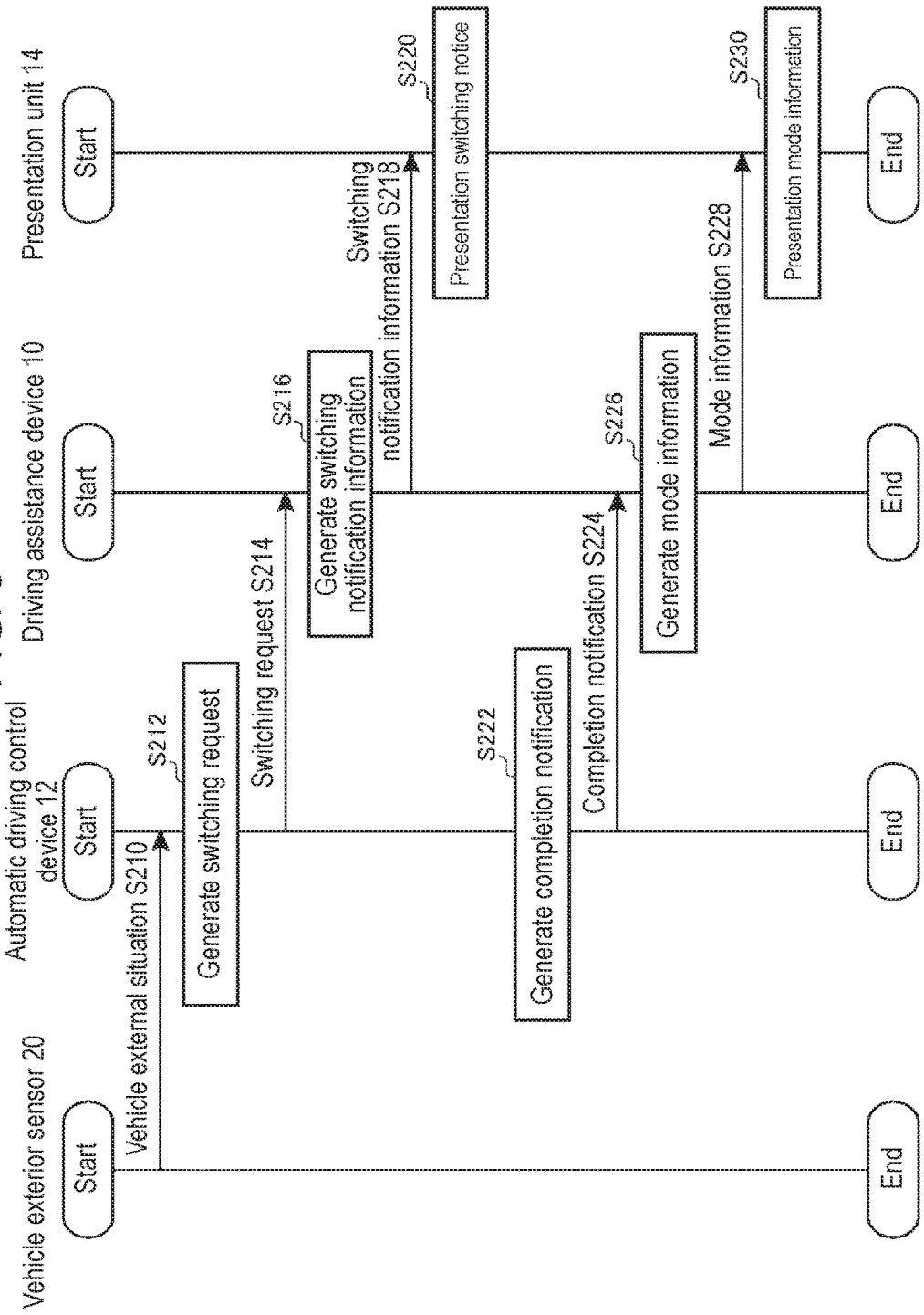
FIG. 9 is a sequence diagram illustrating still another presentation procedure by the vehicle in FIG. 1.

FIG. 9 is a sequence diagram illustrating still another presentation procedure by vehicle 100. This sequence corresponds to the process (3). Vehicle exterior sensor 20 outputs a vehicle exterior situation to automatic driving control device 12 (S210). Automatic driving control device 12 generates a switching request (S212), and outputs the switching request to driving assistance device 10 (S214). Driving assistance device 10 generates switching notification information (S216). Driving assistance device 10 outputs the switching notification information to presentation unit 14 (S218). Presentation unit 14 then presents the switching notification information (S220). Automatic driving control device 12 generates a completion notification (S222), and outputs the completion notification to driving assistance device 10 (S224). Driving assistance device 10 generates mode information (S226), and outputs the mode information to presentation unit 14 (S228). Presentation unit 14 presents the mode information (S230).

Figure 10:
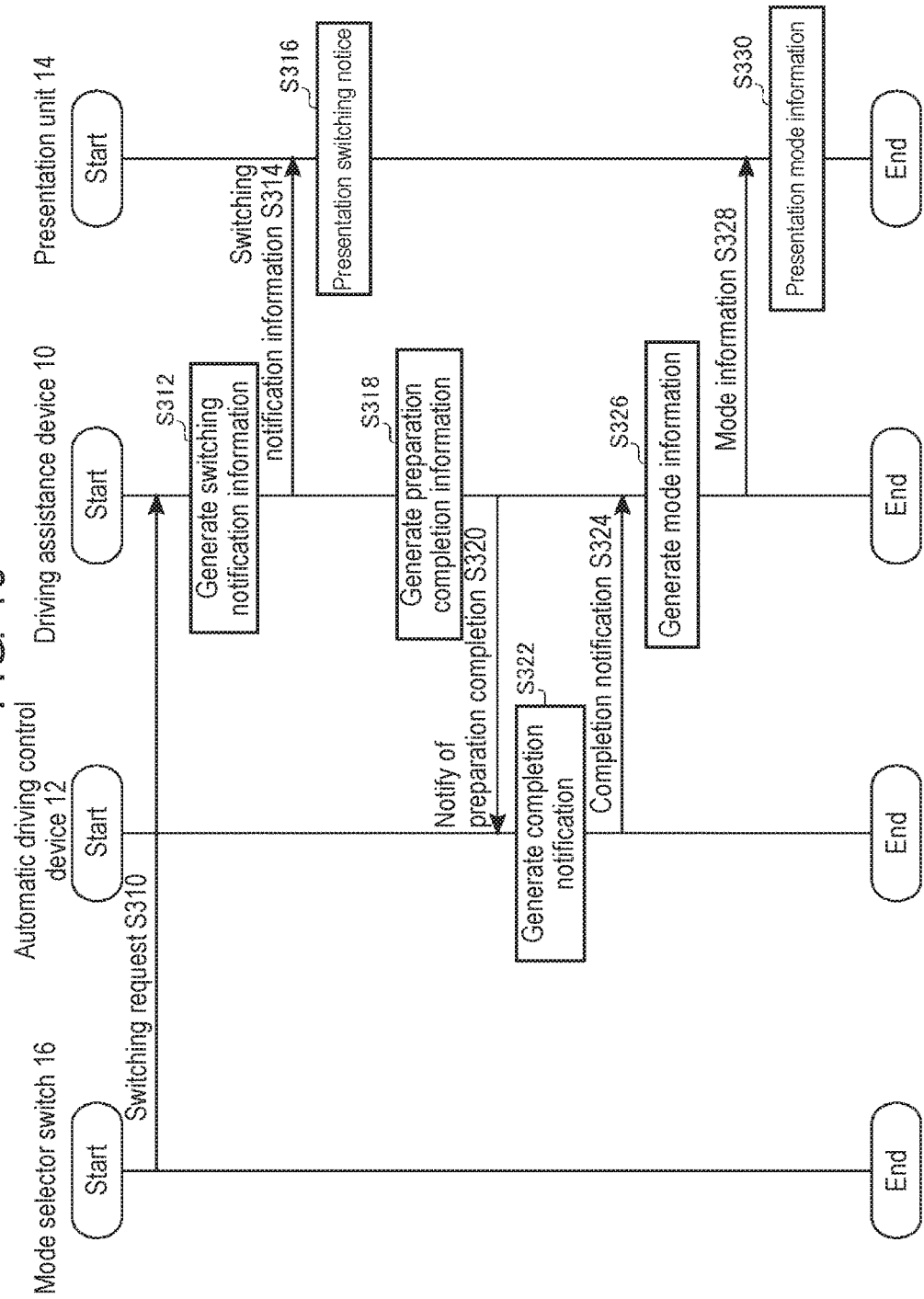
FIG. 10 is a sequence diagram illustrating still another presentation procedure by the vehicle in FIG. 1.

FIG. 10 is a sequence diagram illustrating still another presentation procedure by vehicle 100. This sequence corresponds to the process (4). Mode selector switch 16 outputs the switching request to driving assistance device 10 (S310). Driving assistance device 10 generates switching notification information (S312). Driving assistance device 10 outputs the switching notification information to presentation unit 14 (S314). Presentation unit 14 then presents the switching notification information (S316). Driving assistance device 10 generates preparation completion information (S318), and outputs the preparation completion information to automatic driving control device 12 (S320). Automatic driving control device 12 generates a completion notification (S322), and outputs the completion notification to driving assistance device 10 (S324). Driving assistance device 10 generates mode information (S326), and outputs the mode information to presentation unit 14 (S328). Presentation unit 14 presents the mode information (S330).

According to the present exemplary embodiment, when the switching request is received, the switching notification information is generated, and a switching notice indicated by the switching notification information is presented outward from the vehicle. For this reason, the switching of the driving mode selected in the vehicle can be notified. Further, since the switching of the driving mode is notified, the switching of the driving mode can be notified to a person outside the vehicle. Further, when the request for the switching from the automatic driving mode to the manual driving mode is received, information indicating a degree of completion of a preparation of the driving operation by a driver is included in the switching notification information. Therefore, the degree can be presented. Further, a point is calculated based on a detection result in vehicle exterior sensor 20, and the degree is derived based on the point. Therefore, a person outside the vehicle can estimate how much the driver completes the preparation for the driving operation. Further, since the degree is presented, a person outside the vehicle can estimate a period of time until the driving mode is switched.

Further, the switching notification information is presented while the request for the switching from the manual driving mode to the automatic driving mode is received and the completion notification about the switching to the automatic driving mode is received. Therefore, the switching of the driving mode can be notified. Further, since the switching notification information is generated in a mode according to presentation unit 14, various types of presentation unit 14 can be used.

As described above, driving assistance device 10 can be installed in the vehicle in which a driving mode is selected from either the automatic driving mode or the manual driving mode for traveling. Driving assistance device 10 includes receiving unit 50, generating unit 52, and output unit 56. Receiving unit 50 receives a switching request for the driving mode. Generating unit 52 generates switching notification information in accordance with the switching request received by receiving unit 50. Output unit 56 outputs the switching notification information to presentation unit 14 that presents, outward from vehicle 100, the switching notice indicated by the switching notification information.

In this configuration, when the switching request is received, the switching notification information is generated, and the switching notice indicated by the switching notification information is presented outward from vehicle 100. For this reason, the switching of the driving mode in vehicle 100 can be notified.

In-vehicle sensor 18 as a detector that detects a driver's state may be further provided. When the switching request received by receiving unit 50 indicates the switching from the automatic driving mode to the manual driving mode, generating unit 52 derives, based on the state detected by in-vehicle sensor 18, information indicating a degree of completion of a preparation for the driving operation by a driver. Further, generating unit 52 generates switching notification information including the information derived. Such a configuration may be used. In this case, when the request to switch from the automatic driving mode to the manual driving mode is received, the information indicating the degree of the completion of the preparation for the manual driving mode by the driver is included in the switching notification information. Therefore, the degree can be presented.

After receiving the request to switch from the manual driving mode to the automatic driving mode, receiving unit 50 receives completion notification of the switching to the automatic driving mode. Generating unit 52 generates switching notification information when receiving unit 50 receives the switching request. Further, when receiving unit 50 receives the completion notification about the switching, generating unit 52 generates mode information indicating the automatic driving mode. Output unit 56 outputs the switching notification information generated by generating unit 52 to presentation unit 14, and thus presentation unit 14 presents the switching notice indicated by the switching notification information. Further, output unit 56 outputs the mode information generated by generating unit 52 to presentation unit 14, and thus presentation unit 14 stops presentation of the switching notice indicated by the switching notification information. Such a configuration may be used. In this case, the switching notification information is presented while the request to switch from the manual driving mode to the automatic driving mode is received and the completion notification about the switching to the automatic driving mode is received. Therefore, the switching can be notified.

Generating unit 52 may generate the switching notification information in a mode according to a configuration of presentation unit 14. In this case, since the switching notification information is generated in the mode according to presentation unit 14, various types of presentation unit 14 can be used.

The information presentation device according to the present exemplary embodiment can be installed in a vehicle in which a driving mode is selected from either the automatic driving mode or the manual driving mode. The device includes driving assistance device 10 and presentation unit 14. That is, this device includes receiving unit 50, generating unit 52, output unit 56, and presentation unit 14. Receiving unit 50 receives a switching request for the driving mode. Generating unit 52 generates switching notification information in accordance with the switching request received by receiving unit 50. Output unit 56 outputs the switching notification information generated by generating unit 52. Presentation unit 14 presents, outward from vehicle 100, a switching notice indicated by the switching notification information output from output unit 56.

According to this mode, when the switching request is received, the switching notification information is generated, and the switching notice indicated by the switching notification information is presented outward from vehicle 100. Therefore, switching of the driving mode selected in vehicle 100 can be notified.

In vehicle 100 according to the present exemplary embodiment, the driving mode is selected from either the automatic driving mode or the manual driving mode for traveling. Vehicle 100 includes vehicle body 100A, the above-described information presentation device installed in vehicle body 100A. That is, the information presentation device includes receiving unit 50, generating unit 52, output unit 56, and presentation unit 14. Receiving unit 50 receives a switching request for the driving mode. Generating unit 52 generates switching notification information in accordance with the switching request received by receiving unit 50. Output unit 56 outputs the switching notification information generated by generating unit 52. Presentation unit 14 presents, outward from vehicle body 100A, a switching notice indicated by the switching notification information output from output unit 56.

In this configuration, when the switching request is received, the switching notification information is generated, and the switching notice indicated by the switching notification information is presented outward from vehicle body 100A. Therefore, switching of the driving mode selected in vehicle 100 can be notified.

The driving assistance method according to the present exemplary embodiment is performed in the driving assistance device that can be installed in a vehicle in which a driving mode is selected from either the automatic driving mode or the manual driving mode for traveling. In this method, receiving unit 50 first receives a switching request for the driving mode. Generating unit 52 then generates switching notification information for notifying witching in accordance with the received changing request. Output unit 56 outputs the generated switching notification information to presentation unit 14 that presents, outward from the vehicle, the switching notice indicated by the switching notification information.

The present invention has been described above based on the exemplary embodiment. It will be understood by those skilled in the art that the exemplary embodiment is merely example, other modifications in which components and/or processes of the exemplary embodiment are variously combined are possible, and the other modifications still fall within the scope of the present invention.

In the exemplary embodiment, generating unit 52 calculates a point when a maximum point is "12". However, not limited to this, and for example, the maximum point may be points other than "12". Further, point rates of respective check items are not limited to the point rates in FIG. 5. The modification can improve the degree of freedom in the configuration.

In the exemplary embodiment, a seat position, a seat tilt, a steering position, and steering holding are set as check items when generating unit 52 calculates the point. However, not limited to this and items other than the above-described checks items may be set. For example, whether a driver wears eyeglasses, and driver's drowsiness may be set as the check items. The modification can improve the degree of freedom in the configuration.

The automatic driving according to the present exemplary embodiment is not limited to automatization in the whole driving operation. The automatic driving may be, for example, self-steering such that only a steering operation is automatized or a case where only acceleration and deceleration are automatized.

Further, in the exemplary embodiment, the two driving modes including the automatic driving mode and the manual driving mode have been described, but a plurality of automatic driving modes in which an automatic driving level varies may be set. In this case, however, a side mirror is not adopted as the presentation unit.

INDUSTRIAL APPLICABILITY

The driving assistance device, the information presentation device, the driving assistance method, the program, and the vehicle mounted with them according to the present invention are effective for improving safety of the automatic driving.

REFERENCE MARKS IN THE DRAWINGS 10 driving assistance device
12 automatic driving control device
14 presentation unit
16 mode selector switch
18 in-vehicle sensor
20 vehicle exterior sensor
30, 40 I/O unit
32, 42 processor
50 receiving unit
52 generating unit
54 storage unit
56 output unit
58 switching controller
70 rear window
72 color light
74 communication board
76 indicator
76a first indicator
76b second indicator
76c third indicator
76d fourth indicator
76e fifth indicator
76f sixth indicator
76g seventh indicator
78 side mirror
80 body
100 vehicle
100A vehicle body

The invention claimed is:

1. A driving assistance device configured to be installed in a vehicle in which a driving mode is selected from either an automatic driving mode or a manual driving mode for traveling, the driving assistance device comprising:
a receiver that receives a switching request for switching of the driving mode;
a generator that generates switching notification information in accordance with the switching request received by the receiver, before the switching of the driving mode is completed, the switching notification information indicating as a switching notice that the switching in the switching request is to be performed;
an output unit that outputs the switching notification information generated by the generator to a presentation unit that presents, outward from the vehicle, the switching notice indicated by the switching notification information, before the switching of the driving mode is completed; and
a detector that detects a state of a driver,
wherein when the switching request received by the receiver indicates switching from the automatic driving mode to the manual driving mode, the generator derives information indicating a degree of completion of a preparation for a driving operation by the driver, based on the state detected by the detector, and generates the switching notification information including the information derived, before the switching of the driving mode is completed.

2. The driving assistance device according to claim 1, wherein
after receiving a switching request to switch from the manual driving mode to the automatic driving mode, the receiver receives a completion notification indicating that the switching to the automatic driving mode is completed,
the generator generates the switching notification information when the receiver receives the switching request to switch from the manual driving mode to the automatic driving mode, and generates mode information indicating the automatic driving mode when the receiver receives the switching completion notification, and
the output unit outputs the switching notification information generated by the generator to the presentation unit to cause the presentation unit to present the switching notice indicated by the switching notification information, and outputs the mode information generated by the generator to the presentation unit to cause the presentation unit to stop presentation of the switching notice indicated by the switching notification information.

3. The driving assistance device according to claim 1, wherein the generator generates the switching notification information in a mode according to the presentation unit, before the switching of the driving mode is completed.

4. An information presentation device configured to be installed in a vehicle in which a driving mode is selected from either an automatic driving mode or a manual driving mode for traveling, the information presentation device comprising:
a receiver that receives a switching request for switching of the driving mode;
a generator that generates switching notification information in accordance with the switching request received by the receiver, before the switching of the driving mode is completed, the switching notification information indicating as a switching notice that the switching in the switching request is to be performed;
an output unit that outputs the switching notification information generated by the generator, before the switching of the driving mode is completed;
a presentation unit that presents, outward from the vehicle, the switching notice indicated by the switching notification information output from the output unit, before the switching of the driving mode is completed; and
a detector that detects a state of a driver,
wherein when the switching request received by the receiver indicates switching from the automatic driving mode to the manual driving mode, the generator derives information indicating a degree of completion of a preparation for a driving operation by the driver, based on the state detected by the detector, and generates the switching notification information including the information derived, before the switching of the driving mode is completed.

5. A driving assistance method in a driving assistance device configured to be installed in a vehicle in which a driving mode is selected from either an automatic driving mode or a manual driving mode for traveling, the driving assistance method comprising:
- receiving a switching request for switching of the driving mode;
- generating switching notification information in accordance with the switching request received, before the switching of the driving mode is completed, the switching notification information indicating as a switching notice that the switching in the switching request is to be performed;
- outputting the switching notification information generated to a presentation unit that presents, outward from the vehicle, the switching notice indicated by the switching notification information, before the switching of the driving mode is completed; and
- detecting a state of a driver,
- wherein when the switching request received indicates switching from the automatic driving mode to the manual driving mode, the generating includes:
  - deriving information indicating a degree of completion of a preparation for a driving operation by the driver, based on the state of the driver, and
  - generating the switching notification information including the information derived, before the switching of the driving mode is completed.

6. A non-transitory machine-readable recording medium that stores a program that, when executed by a computer of a driving assistance device to be installed in a vehicle in which a driving mode is selected from either an automatic driving mode or a manual driving mode for traveling causes the computer to:
- receive a switching request for switching of the driving mode;
- generate switching notification information in accordance with the switching request received, before the switching of the driving mode is completed, the switching notification information indicating as a switching notice that the switching in the switching request is to be performed;
- output the switching notification information generated, to a presentation unit that presents, outward from the vehicle, the switching notice indicated by the switching notification information, before the switching of the driving mode is completed; and
- detect a state of a driver,
- wherein, when the switching request received indicates switching from the automatic driving mode to the manual driving mode, the program causes the computer to:
  - derive information indicating a degree of completion of a preparation for a driving operation by the driver, based on the state of the driver, and
  - generate the switching notification information including the information derived, before the switching of the driving mode is completed.

* * * * *